United States Patent
Dalmau et al.

(10) Patent No.: US 8,767,565 B2
(45) Date of Patent: *Jul. 1, 2014

(54) FLEXIBLE NETWORK TEST APPARATUS

(75) Inventors: John Dalmau, Simi Valley, CA (US); Victor Alston, Oak Park, CA (US); Gerald Pepper, Thousand Oaks, CA (US); Viet Quoc Tran, Reseda, CA (US)

(73) Assignee: Ixia, Calabasas, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/231,885

(22) Filed: Sep. 13, 2011

(65) Prior Publication Data

US 2012/0236728 A1    Sep. 20, 2012

Related U.S. Application Data

(63) Continuation-in-part of application No. 12/822,911, filed on Jun. 24, 2010, which is a continuation of application No. 12/253,836, filed on Oct. 17, 2008, now Pat. No. 7,769,049, application No. 13/231,885, filed on Sep. 13, 2011, which is a continuation-in-part of application No. 13/101,987, filed on May 5, 2011, now Pat. No. 8,457,128, which is a continuation of application No. 12/420,771, filed on Apr. 8, 2009, now Pat. No. 7,953,092.

(51) Int. Cl.
   *H04L 12/26*    (2006.01)

(52) U.S. Cl.
   USPC .......................................... 370/250; 370/535

(58) Field of Classification Search
   None
   See application file for complete search history.

(56) References Cited

U.S. PATENT DOCUMENTS

| | | |
|---|---|---|
| 5,343,463 A | 8/1994 | van Tetering et al. |
| 5,600,632 A | 2/1997 | Schulman |
| 5,884,025 A | 3/1999 | Baehr et al. |
| 6,028,847 A | 2/2000 | Beanland |
| 6,091,740 A | 7/2000 | Karasawa |

(Continued)

FOREIGN PATENT DOCUMENTS

EP    0895375    2/1999

OTHER PUBLICATIONS

Ixia, Specifications for Load Modules—Multilayer Gigibit Ethernet for LM1000LX, LM1000SX, LM1000GBIC, LM1000T, Product Specification Sheet.

(Continued)

*Primary Examiner* — Gregory Sefcheck
(74) *Attorney, Agent, or Firm* — SoCal IP Law Group LLP; John E. Gunther; Steven C. Sereboff

(57) ABSTRACT

Apparatus, method, and storage medium for testing a network. A network card may include four transmit engines and four receive engines to respectively generate and process packets at a data rate of 10 GHz. The network card may be configured in a first mode to also include four 10 GHz network interface units coupled to respective ones of the four 10 GHz transmit engines and the four 10 GHz receive engines. The network card may be configured in a second mode to also include a coherent multiplexer to combine packets generated by the four 10 GHz transmit engines into test traffic at a 40 GHz data rate, a packet distribution engine to accept packets at a 40 GHz data rate and distribute the accepted packets between the four 10 GHz receive engines, and a 40 GHz network interface unit coupled to the coherent multiplexer and the packet distribution engine.

11 Claims, 6 Drawing Sheets

(56) References Cited

U.S. PATENT DOCUMENTS

| | | | |
|---|---|---|---|
| 6,108,800 | A | 8/2000 | Asawa |
| 6,122,670 | A | 9/2000 | Bennett et al. |
| 6,148,277 | A | 11/2000 | Asava |
| 6,233,256 | B1 | 5/2001 | Dieterich et al. |
| 6,345,302 | B1 | 2/2002 | Bennett et al. |
| 6,453,345 | B2 | 9/2002 | Trcka et al. |
| 6,789,100 | B2 | 9/2004 | Nemirovsky |
| 6,944,186 | B2 | 9/2005 | Zaun et al. |
| 6,950,405 | B2 * | 9/2005 | Van Gerrevink .............. 370/252 |
| 7,000,158 | B2 * | 2/2006 | Goyal et al. .................. 714/715 |
| 7,075,944 | B1 * | 7/2006 | Takagi ........................ 370/470 |
| 7,194,535 | B2 * | 3/2007 | Hannel et al. ................ 709/224 |
| 7,633,944 | B1 | 12/2009 | Chang et al. |
| 8,160,106 | B2 * | 4/2012 | Valadarsky .................. 370/477 |
| 2001/0016023 | A1 | 8/2001 | Roy et al. |
| 2002/0080781 | A1 | 6/2002 | Gustavsson |
| 2002/0167912 | A1 * | 11/2002 | Melville et al. .............. 370/252 |
| 2003/0069952 | A1 | 4/2003 | Tams |
| 2003/0165116 | A1 | 9/2003 | Fallon et al. |
| 2003/0208616 | A1 | 11/2003 | Liang et al. |
| 2004/0042415 | A1 * | 3/2004 | Melville et al. .............. 370/252 |
| 2004/0078494 | A1 * | 4/2004 | Lennox et al. ................... 710/1 |

OTHER PUBLICATIONS

Ixia, The Ixia 200 Traffic Generator and Analyzer, Product Description, 1997-1999.

* cited by examiner

FLEXIBLE NETWORK TEST APPARATUS

RELATED APPLICATION INFORMATION

This patent is a continuation-in-part of the following prior-filed copending non-provisional patent applications: application Ser. No. 12/822,911, filed Jun. 24, 2010, entitled High Speed Traffic Generator, which is a continuation of application Ser. No. 12/253,836, filed Oct. 17, 2008, entitled Traffic Generator Using Parallel Coherent Transmit Engines, now U.S. Pat. No. 7,769,049; and application Ser. No. 13/101,987, filed May 5, 2011, entitled Capturing Packets With Parallel Capture Engines, now U.S. Pat. No. 8,457,128, which is a continuation of application Ser. No. 12/420,771, filed Apr. 8, 2009, entitled Traffic Receiver Using Parallel Capture Engines, now U.S. Pat. No. 7,953,092; each of which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, and 3 of the structure are the physical layer, the data link layer, and the network layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as WIFI.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

In order to test a packet switched network or a device included in a packet switched communications network, test traffic comprising a large number of packets may be generated, transmitted into the network at one or more ports, and received at different ports. Each packet in the test traffic may be a unicast packet intended for reception at a specific destination port or a multicast packet, which may be intended for reception at two or more destination ports. In this context, the term "port" refers to a communications connection between the network and the equipment used to test the network. The term "port unit" refers to a module with the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

A series of packets originating from a single port unit and having a specific type of packet and a specific rate will be referred to herein as a "stream." A source port unit may support multiple outgoing streams simultaneously and concurrently, for example to accommodate multiple packet types, rates, or destinations. "Simultaneously" means "at exactly the same time." "Concurrently" means "within the same time."

For the purpose of collecting test data, the test traffic may be organized into packet groups, where a "packet group" is any plurality of packets for which network traffic statistics are accumulated. The packets in a given packet group may be distinguished by a packet group identifier (PGID) contained in each packet. The PGID may be, for example, a dedicated identifier field or combination of two or more fields within each packet.

For the purpose of reporting network traffic data, the test traffic may be organized into flows, where a "flow" is any plurality of packets for which network traffic statistics are reported. Each flow may consist of a single packet group or a small plurality of packet groups. Each packet group may typically belong to a single flow.

Within this patent, various descriptive names (i.e. engine, scheduler, generator, receiver, interface unit, etc.) may be given to functional hardware blocks. Each of these names refers to a collection of hardware, which may be augmented by firmware and/or software, which performs the described functions. A functional hardware block may typically be designed using a hardware description language (HDL) that defines the functional hardware block primarily in functional terms. The HDL design may be verified using an HDL simulation tool. The verified HDL design may then be converted into a gate netlist or other physical description of the functional hardware block in a process commonly termed "synthesis". The synthesis may be performed automatically using a synthesis tool. The gate netlist or other physical description may be further converted into programming code for implementing the functional hardware block in a programmable hardware device such as a field programmable gate array (FPGA), a programmable logic device (PLD), or a programmable logic arrays (PLA). The gate netlist or other physical description may be converted into process instructions and masks for fabricating the functional hardware block within an application specific integrated circuit (ASIC).

The names given to functional hardware blocks do not imply any physical separation or demarcation. All or portions of one or more functional hardware blocks may be collocated on a common card, such as a network card 106, or within a common FPGA, ASIC, or other circuit device.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
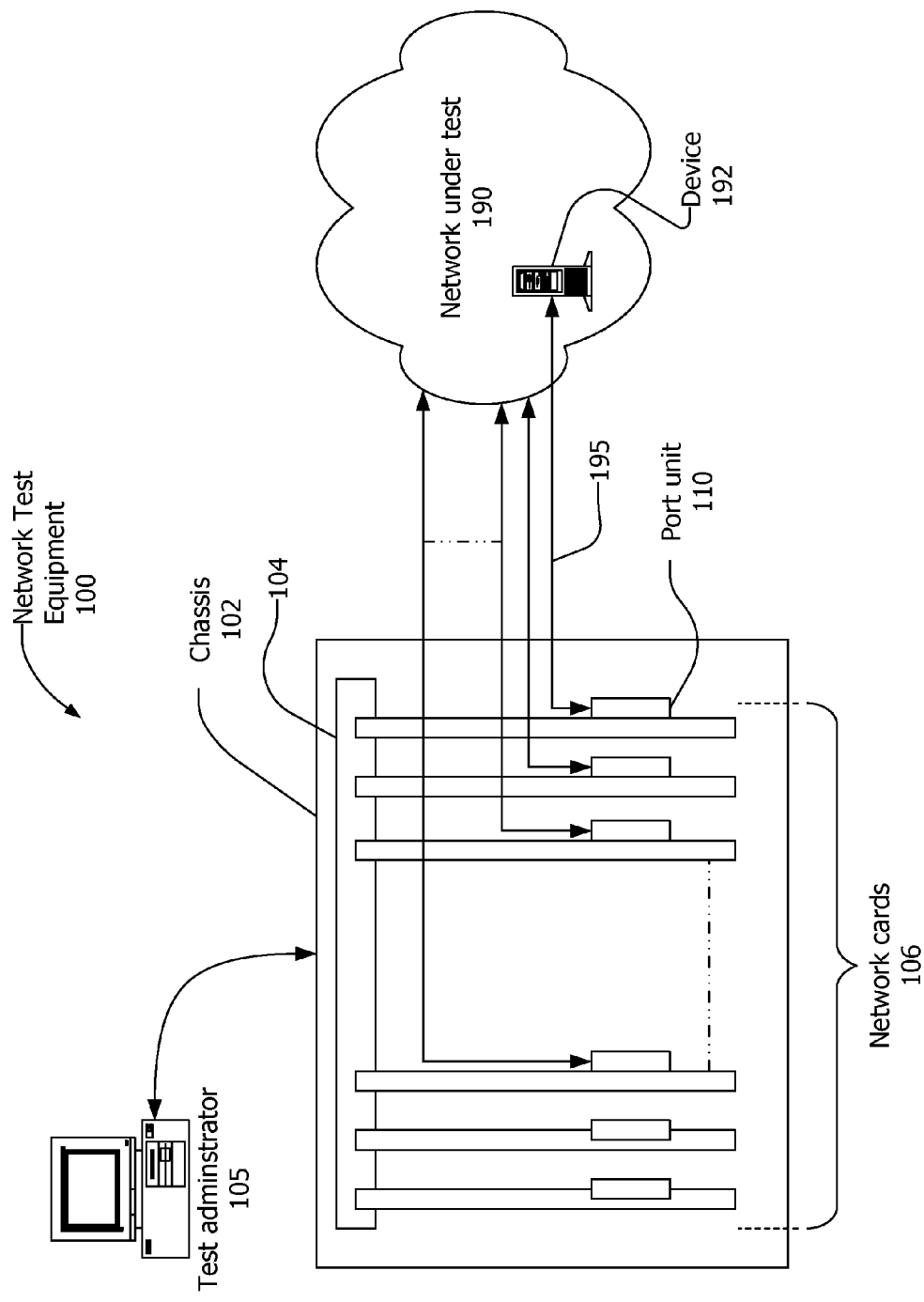
FIG. 1 is a block diagram of a network environment.

FIG. 1 shows a block diagram of a network environment. The environment may include network test equipment 100, a network 190 and plural network devices 192.

The network test equipment 100 may be a network testing device, performance analyzer, conformance validation system, network analyzer, or network management system. The network test equipment 100 may include, for example, one or more network cards 106 and a backplane 104 contained or enclosed within a chassis 102. The chassis 102 may be a fixed or portable chassis, cabinet, or enclosure suitable to contain the network test equipment 100. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors and other kinds of programmable hardware devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like.

The network test equipment 100 may be physically configured in some form other than a chassis containing cards. The term network card also encompasses modules, units, and other assemblies used to interface to a network. Each network card 106 may contain one or more port unit 110. Each port unit 110 may connect to the network 190 through one or more ports. The port units 110 may be connected to the network 190 through a communication medium 195, which may be a wire, an optical fiber, a wireless link, or other communication medium. Each network card 106 may support a single communications protocol, may support a number of related protocols, or may support a number of unrelated protocols. The network cards 106 may be permanently installed in the network test equipment 100 or may be removable.

The backplane 104 may serve as a bus or communications medium for the network cards 106. The backplane 104 may also provide power to the network cards 106.

The network devices 192 may be any devices capable of communicating over the network 190. The network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 192 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 192. The network itself may be comprised of numerous nodes providing numerous physical and logical paths for data to travel. Each port unit 110 may be connected, via a specific communication medium 195, to a corresponding port on a network device 192.

Traditionally, each network card 106 and port unit 110 may support only a single data communication rate or a narrow range of data communication rates such that different network cards 106 are commonly required to networks, network devices, and network ports that operate at different communications rates. For example, a conventional 10 GHz network card may not support communications at 1 GHZ, 40 GHz or 100 GHz.

Figure 2:
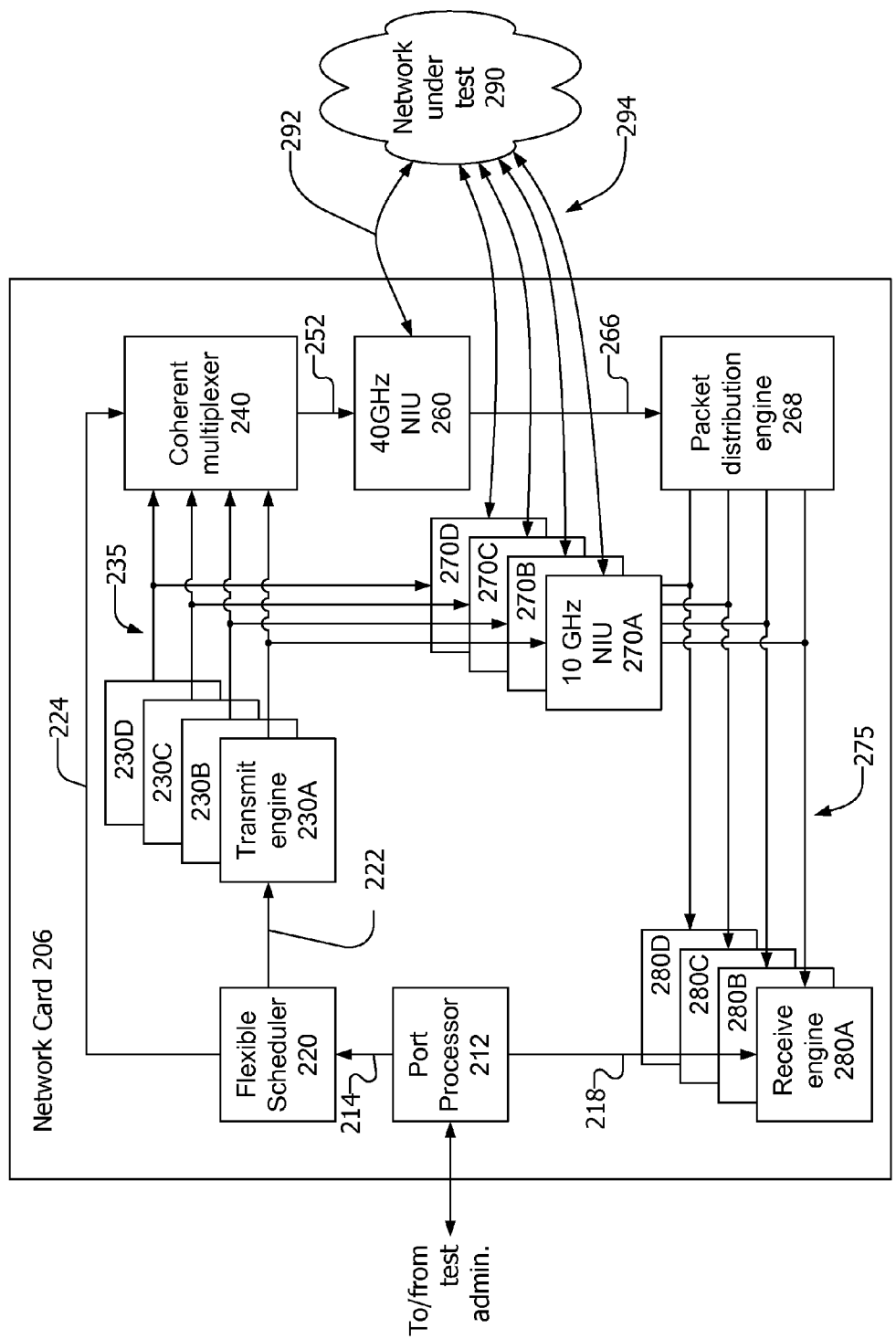
FIG. 2 is a block diagram of a network card.

Referring now to FIG. 2, an exemplary network card 206 may be configurable in a first mode or a second mode. When configured in the first mode, the network card 206 may operate as a plurality of port units operating at a first communications rate. When configured in the second mode, the network card 206 may operate as a single port unit operating at a second communications rate higher than the first communications rate. In the example of FIG. 2, the network card 206 may be configured in the first mode to operate as four 10 GHz port units, and may be configured in the second mode to operate as one 40 GHz port unit. The term "10 GHz port unit" means a port unit compatible with a communications link having a data rate of approximately 10 GHz. A 10 GHz port unit may be compatible with a communication standard such as 10 GHz Ethernet as defined in IEEE Standard 802.3-2008, GHz Fibre Channel, OC192 SONET, and/or another current or future communications standard having a data rate of approximately 10 GHz. The term "40 GHz port unit" means a port unit compatible with a communications link having a data rate of approximately 40 GHz. A 40 GHz port unit may be compatible with a communication standard such as 40 GHz Ethernet as defined in IEEE Standard 802.3ba, OC768 SONET, and/or another future communications standard having a data rate of approximately 10 GHz. The selection of four port units operable at a first communications rate of approximately 10 GHz and a single port unit operable at a second communications rate of approximately 40 GHz is exemplary. A network card such as the network card 206 may be configured to have more or fewer than four ports unit and to operate at data rates other than 10 GHz and 40 GHz.

The network card 206 may include a port processor 212, a flexible scheduler 220, four transmit engines 230A, 230B, 230C, 230D, and four receive engines 280A, 280B, 280C, 280D. The flexible scheduler may be "flexible" in that it can be configured to schedule either a single 40 GHz test data flow or four independent 10 GHz test data flows.

When the network card 206 is configured in the first mode, the four transmit engines 230A-D and the four receive engines 280A-D may be coupled to a network under test 290 through respective 10 GHz network interface units (NIUs) 270A, 270B, 270C, 270D. When the network card 206 is configured in the second mode, packet streams generated by the four transmit engines 230A-D may be combined by a coherent multiplexer 240 and transmitted to the network under test 290 via a 40 GHz NIU 260. Conversely, traffic received from the network under test 290 via the 40 GHz NIU 260 may be distributed between the four receivers 280A-280D by a packet distribution engine 268.

Portions of the network card 206 which are necessary only when the card is configured in the first mode (i.e. the 10 GHz NIUs 270A-D) and portions of the network card 206 which are necessary only when the card is configured in the second mode (i.e the coherent multiplexer 240, the 40 GHz NIU 260, and the packet distribution engine 268) need not coexist. The network card 206 may include one or more programmable gate arrays or other programmable hardware devices. Configuring the network card in the first mode may include configuring one or more programmable hardware devices to include the 10 GHz NIUs 270A-D. Configuring the network card in the second mode may include configuring the one or more programmable hardware devices to include the coherent multiplexer 240, the 40 GHz NIU 260, and the packet distribution engine 268. At least some common circuitry within the one or more programmable hardware devices may be used to implement either the 10 GHz NIUs 270A-D or the coherent multiplexer 240, the 40 GHz NIU 260, and the packet distribution engine 268 depending on whether the network card 206 is configured in the first mode or the second mode.

Configuring the one or more programmable hardware devices may include reading configuration data from a machine-readable storage medium and using the configuration data to program the programmable hardware device to include the required circuits and functions. Machine-readable storage media include, for example, magnetic media such as hard disks, floppy disks and tape; optical media such as compact disks (CD-ROM and CD-RW) and digital versatile disks (DVD and DVD±RW); flash memory cards; and other storage media. As used herein, the term "machine-readable" storage medium" is not intended to include transient data-conveying media such as electrical or optical signals.

The port processor 212 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port processor 212 may communicate with a test administrator (not shown). The test administrator may be a computing device contained within, or external to, the network test equipment 100. The test administrator may provide the port processor 212 with instructions and data required for the port unit to participate in testing the network under test 290. The instructions and data received from the test administrator may include, for example, definitions of packet streams to be generated by the network card 206 and definitions of performance statistics that may be accumulated and reported by the network card 206.

First Mode

When the network card 206 is configured in the first mode, the transmit engine 230A, the 10 GHz network interface unit 270A, and the receive engine 280A may constitute a first port unit. Similarly, the elements 230B/2070B/280B may constitute a second port unit, the elements 230B/270C/280C may constitute a third port unit, and the elements 230D/270D/280D may constitute a fourth port unit. The port processor 212 and the flexible scheduler 220 may be shared by the four port units.

The port processor 212 may provide the flexible scheduler 220 with instructions 214 to form a plurality of streams that may be interleaved to form four independent test data flows. Each of the streams may include a sequence of packets. The packets within each steam may be of the same general type but may vary in length and content. In the first mode, each stream may be associated with a specific test data flow. The instructions 214 may include, for each packet stream, the type of packet, the frequency of transmission, the associated test data flow, other information needed to generate each packet stream.

Each of the four test data flows may be generated by a corresponding one of the four transmit engines 230A-D. In this case, the flexible scheduler may determine, based on the instructions 214, four independent sequences of packets to be generated by the four transmit engines 230A-D. The transmit engines 230A-230D may work independently in parallel to generate the corresponding test data flows 235A, 235B, 2325C, 235D.

The flexible scheduler may pass packet forming data 222 required to generate each packet to the transmit engines 230A-230D. The packet forming data 222 may include, for each packet, a stream identifier that identifies the type of packet and other data such as a packet length, variable data to be incorporated into the packet, and instructions for filling the packet payload.

The transmit engines 230A-D may generate assigned packets in sequence according to the packet forming data 222 received from the flexible schedule 220. To generate packets, each transmit engine 230A-D may use the stream identifier provided by the flexible scheduler 220 to retrieve a corresponding packet template from a template memory. Each transmit engine 230A-D may set a length for the packet and may generate data to fill variable-content portions of the packet. Each transmit engine 230A-D may embed test data within each packet. The test data may include, for example, a packet group identifier, a sequence number, and/or a timestamp. Each transmit engine 230A-D may also calculate and embed one or more checksums and/or a cyclic redundancy check value prior to sending the completed packet to the associated 10 GHz network interface unit 270A-D for transmission to the network under test 290.

Figure 6:
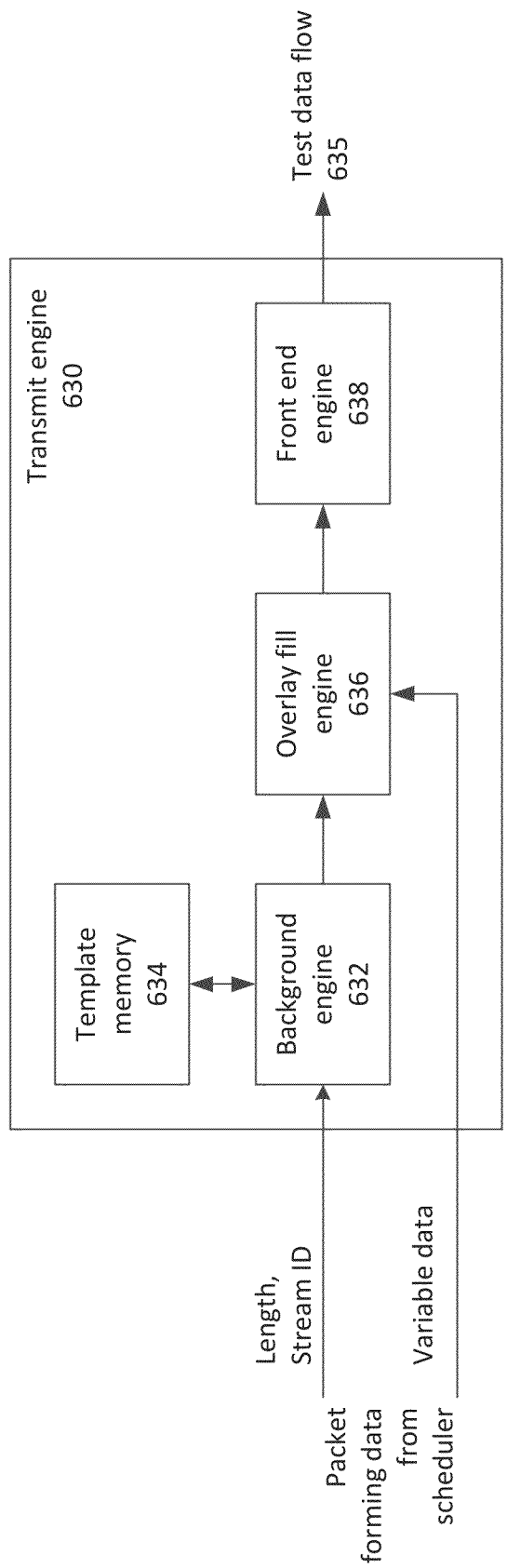
FIG. 6 is block diagram of a transmit engine.

Referring now to FIG. 6, an exemplary transmit engine 630, which may be suitable for use as the transmit engines 230A-230D, may include a template memory 644, a background engine 632, an overlay fill engine 636, and a front end engine 638.

The template memory 634 may store templates for each of the packet streams and/or packet types that may be formed by the transmit engine 630. Each template may define a specific packet structure including the length and content of the packet header, the location and content of any fixed data fields, the location and extend of any fields to be filled by variable data, the location and type of any checksums or other calculated fields, and other information necessary to form the packet. The template memory 634 may be a read-only memory to store a fixed set of templates, or a writable memory where packet templates may be stored dynamically, or a combination of read-only and writable memories. Packet templates may be stored in a writable template memory 634 by a processor (not shown), for example, at the start of each test session.

Upon receipt of packet forming data including a stream ID or other data indicating the type of packet to be formed, the background engine 632 may retrieve the appropriate packet template from the template memory 634. The background engine 632 may also extend or truncate the template to set the packet length as indicated in the packet forming data.

After the appropriate template has been retrieved, the overlay fill engine 636 may insert the variable data included in the packet forming data into the appropriate fields of the packet as indicated by the template. One of the background engine 632 and the overlay fill engine 636 may fill the payload of the packet 635 as instructed in the packet forming data.

After the packet length has been set, the payload has been filled, and the variable data has been inserted, a front end engine 638 may complete forming the packet 635 by computing and inserting any required checksums. For example, the front end engine 638 may compute an IP header checksum, a TCP header checksum, and a CRC code or checksum for the entire packet. The header checksums may be calculated and inserted into the packet before the packet 635 is sent to a multiplexer (not shown), since the header checksums are commonly positioned in the packet before at least a portion of the data being checked. A checksum for an entire packet may be calculated while the packet is being sent and then inserted at the very end of the packet.

The four 10 GHz network interface units 270A-D may convert the outgoing test traffic 235 from respective traffic generator units 230A-D into the electrical, optical, or wireless signal format required to transmit the test traffic to the network under test 290 via respective links 294. Each link 294 may be a wire, an optical fiber, a wireless link, or other communication link. Similarly, the 10 GHz network interface units 270A-D may receive electrical, optical, or wireless signals from the network over the respective links 294 and may convert the received signals into incoming test traffic 275 in a format usable to respective receive engines 280A-D.

Each receive engine 280A-D may receive incoming test traffic 275 from the respective 10 GHz network interface unit 270A-D. Each traffic receive 280A-D may determine if each received packet is a member of a specific packet group, and may accumulate test statistics for each packet group in accordance with test instructions 218 provided by the port processor 212. The accumulated test statistics may include, for example, a total number of received packets, a number of packets received out-of-sequence, a number of received packets with errors, a maximum, average, and minimum latency, and other statistics for each packet group. Each receive engine 280A-D may also capture and store specific packets in accordance with capture criteria included in the test instructions 218. Each receive engine 280A-D may provide test statistics and/or captured packets to the port processor 212, in accordance with the test instructions 218, for additional analysis during or subsequent to the test session. The four receive engines 280A-D may operate independently and may report results separately to the port processor 212 and/or the test administrator (not shown).

Second Mode

When the network card 206 is configured in the second mode, the four transmit engines 230A-D, the 40 GHz network interface unit 260, the four receive engines 280A-D, the port processor 212, and the flexible scheduler 220 may collectively constitute a single 40 GHz port unit.

The port processor 212 may provide the flexible scheduler 220 with instructions 214 to form a plurality of streams that may be interleaved to form one 40 GHz test data flows. Each of the streams may include a sequence of packets. The packets within each steam may be of the same general type but may vary in length and content. The instructions 214 may include, for each packet stream, the type of packet, the frequency of transmission, and other information needed to generate each packet stream.

In the second mode, each packet stream need not be associated with a single transmit engine. The flexible scheduler may determine, based on the instructions 214, the packets required for each stream and then merge the streams into a single sequence of packets to be generated. The flexible scheduler may assign each packet in the sequence to one of the four transmit engines 230A-D. Packets may be assigned to the four transmit engines 230A-230D in round-robin fashion. Packets may be assigned in a deterministic manner to equalize the load on the four transmit engines 230A-230D. For example, each transmit engine 230A-230D may include a first-in-first-out (FIFO) input queue to hold packet forming data for packets that have not yet been generated. The flexible scheduler may assign each new packet to the transmit engine with the most available space in its FIFO input queue.

The transmit engines 230A-230D may work independently in parallel to generate the assigned packets in sequence. The operation of the transmit engines may be similar or identical to their operation when the network card is configured in the first mode. Each transmit engine 230A-230D may output a corresponding 10 GHz test data flow 235.

The coherent multiplexer 240 may coherently combine the 10 GHz test data flows 235 formed by the transmit engines 240A-240D to form a single 40 GHz test data flow 252. Within this description, the term "coherently" means "in a coherent manner", where "coherent" has its conventional definition of "logically consistent and ordered". Specifically, "to coherently combine" the 10 GHz test data flows generated by the transmit engines 240A-240D means that the packets of the four 10 GHz data flows are interleaved in an intended order that is determined before the packets are generated. The coherent combining may be based on packet sequence data 224 transmitted from the flexible scheduler 220 to the coherent multiplexer 240. The packet sequence data 224 may include data identifying which of the transmit engines 230A-230D will contribute the next packet to the 40 GHz test data flow 252.

Figure 3:
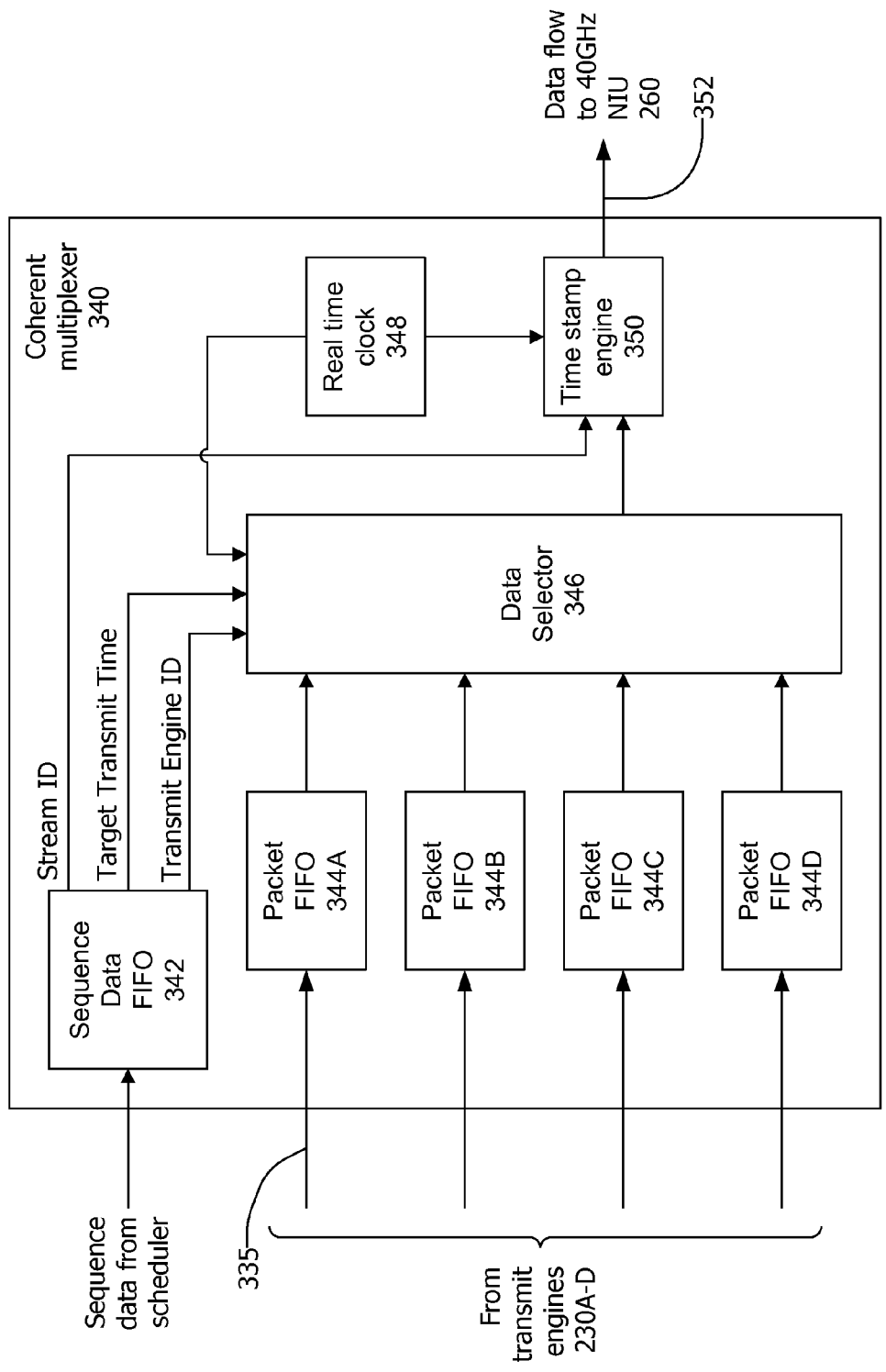
FIG. 3 is a block diagram of a coherent multiplexer.

Referring now to FIG. 3, an exemplary coherent multiplexer 340, which may be suitable for use as the coherent multiplexer 240, may include a sequence data FIFO buffer 342, a plurality of packet FIFO buffers 344A, 344B, 344C, 344D corresponding to a plurality of transmit engines (not shown) such as the transmit engines 230A-D, and a data selector 346. The exemplary coherent multiplexer 340 may also include a real time clock 348, and a time stamp engine 350. Each FIFO buffer 344A-D may include, for example, a memory with pointer registers to indicate the address where new data may be written and where the oldest data in the memory data may be read. The exemplary coherent multiplexer 340 may receive 10 GHz test data flows 335 from the plurality of transmit engines and may interleave the packets of the 10 GHz test data flows into a single 40 GHz test data flow 352 sent to a network interface unit (not shown) such as the 40 GHz network interface unit 260.

Packets from the 10 GHz test data flows 335 may be loaded into the packet FIFO buffers 344A-D in the order that the packets are formed by the respective transmit engines. The order in which the packets are formed may have been controlled such that packets stored within any one packet FIFO buffers 344A-D do not have to be reordered.

Packet sequence data may be loaded into the sequence data FIFO buffer 342 in the order that packets are to be placed in the 40 GHz test data flow 352, such that the packet sequence data next to be read from the sequence data FIFO buffer 342 may be the packet sequence data for the next packet to be inserted into the 40 GHz test data flow 352.

The data selector 346 may read packet sequence data for a packet from the sequence data FIFO buffer 342. The packet sequence data may include a transmit engine ID that identifies which transmit engine (not shown) formed the packet and thus which of the packet FIFO buffers 344A-D now stores the packet. The data selector 346 may then read the packet from the identified packet FIFO buffer 344A, 344B, 344C, or 344D and send the packet to the 40 GHz network interface unit (not shown) as part of the 40 GHz test data flow 352. As the data selector 346 completes sending the current packet, the data selector 346 may read the packet sequence data from the packet sequence data FIFO 342 to repeat the cycle for the next packet.

The exemplary multiplexer 340 may include a real time clock 348 and a time stamp engine 350. The time stamp engine 350 may add a time stamp to some or all of the packets indicating the exact instant that each packet was transmitted as part of the 40 GHz test data flow 352. The time stamp added to the packet may indicate a transmit time slightly later than real time to compensate for known delays in the network interface unit. Depending on the location of the time stamp within the packet, the time stamp engine 350 may also correct one or more checksums within the packet. To determine the appropriate position for the timestamp and the checksums within a packet, the time stamp engine 350 may extract a stream ID or other data defining the type of the packet from the packet sequence data associated with the packet.

The packet sequence data for some or all of the packets may include a target transmit time. The data selector 346 may compare the target transmit time of a packet with the time provided by the real time clock 348 and insert the packet into the 40 GHz test data flow 352 at an appropriate time. The data selector 346 may insert the packet into the 40 GHz test data flow 352 in advance of the target transmit time to compensate for known delays in the time stamp engine 350 and the 40 GHz network interface unit (not shown).

Referring back to FIG. 2, the 40 GHz network interface unit 260 may convert the 40 GHz test traffic flow 252 from the coherent multiplexer 240 into the electrical, optical, or wireless signal format required to transmit the test traffic to the network under test 290 via a 40 GHz link 292. The 40 GHz link 292 may be one or more wires or optical fibers, a wireless link, or other communication link. Similarly, the 40 GHz network interface unit 260 may receive electrical, optical, or wireless signals from the network over the 40 GHz link 294 and may convert the received signals into incoming 40 GHz test traffic 266 in a format usable to the receive engines 280A-D.

The packet distribution engine 268 may accept the 40 GHz incoming test data 266 from the 40 GHz network interface unit 260 and distribute the received packets to the four receive engines 280A-D. For example, the packet distribution engine 268 may distribute the received packets in round-robin fashion, such that each of the 4 receive engines 280A-D receives every fourth packet. For further example, each of the four receive engines 280A-D may include an input FIFO queue to hold packets awaiting processing. The packet distribution engine 268 may distribute the received packets such that each received packet is routed to the input FIFO queue having the most available capacity. In this manner, the total length of the received packets may be more uniformly distributed between the plurality of receive engines 280A-D. The packet distribution engine 268 may temporarily store received packets in a buffer and may distribute the received packets to the four receive engines 280A-D at a data rate of 10 GHz. The packet distribution engine 268 may effectively convert the 40 GHz incoming test data 266 into four 10 GHz test data flows 275.

Each receive engine 280A-D may receive a respective one of the 10 GHz test data flows 275 from the packet distributor 268. Each receive engine 280A-D may accumulate test statistics and store captured packets in accordance with test instructions 218 provided by the port processor 212. Each receive engine 280A-D may operate similarly or identically to its operation when the network card 206 is configured in the first mode. Each receive engine 280A-D may accumulate test statistics and capture packets independently of the other receive engines. However, the test statistics and captured packets stored by each receive engine 280A-D are not independent. Each receive engine 280A-D may store a portion of the test statistics and captured packets derived from a single 40 GHz test traffic flow 26. Thus, the test statistics and captured packets from the receive engines 280A-D may be consolidated prior to reporting test results to the test administrator (not shown).

Test statistics and captured packets from the receive engines 280A-D may be consolidated, at least in part, using logic circuits and other hardware within one or more of the receive engines 280A-D. Test statistics and captured packets may be consolidated, at least in part, by software executed by the port processor 212. Test statistics and captured packets may be consolidated by hardware and/or software configured to perform the processes described herein.

Description of Processes

Figure 4:
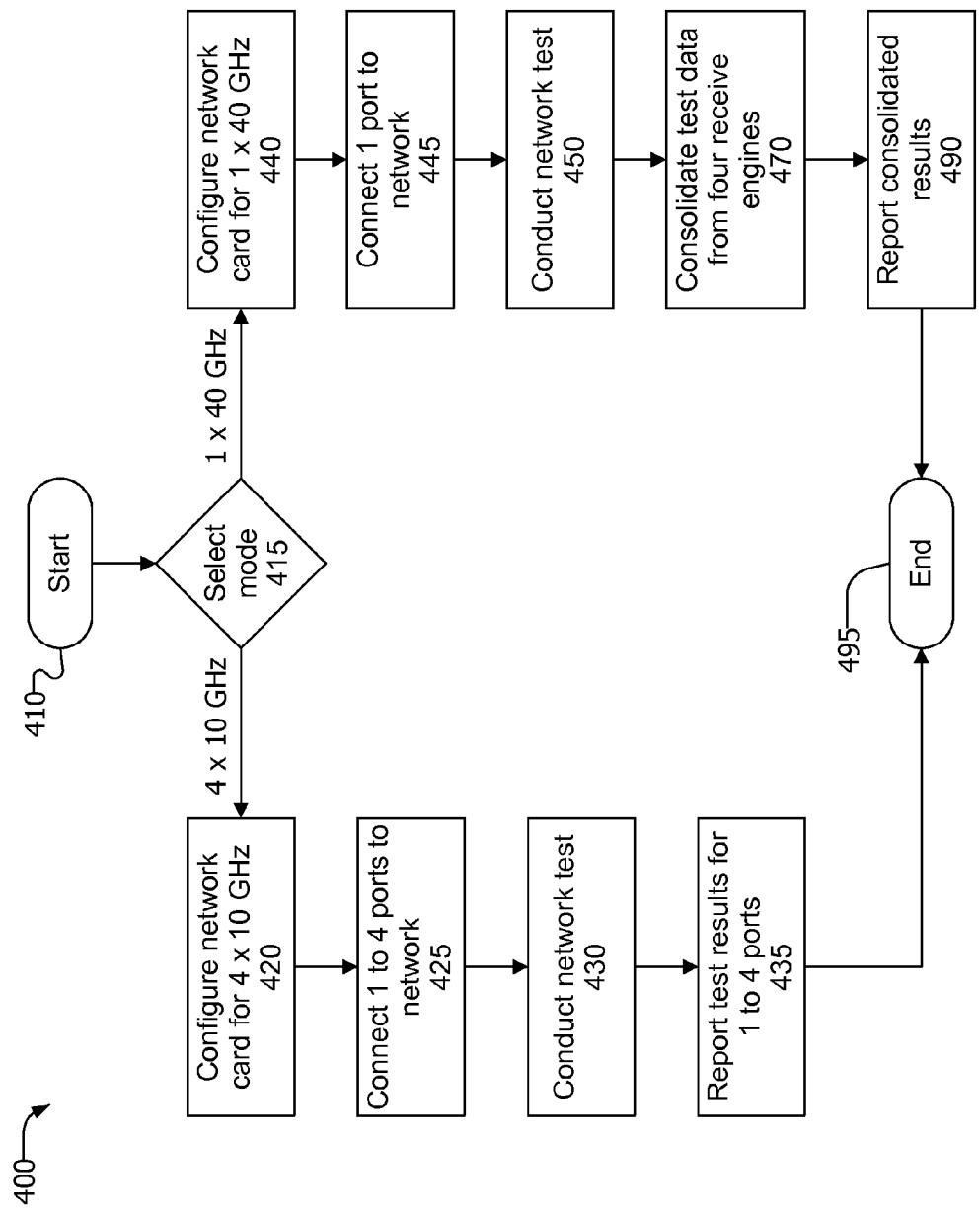
FIG. 4 is a flow chart of a process for testing a network.

Referring now to FIG. 4, a process 400 for testing a network may start at 410 and may end at 495, typically after a large number of packets have been generated, transmitted, and received. The process 400 may be appropriate for testing a network using one or more flexible network cards, such as the network card 206. The flow chart of FIG. 4 shows the process 400 as performed by a single network card. It should be understood that the process 400 may be performed simultaneously by a plurality of network cards in parallel during a test session.

Prior to the start 410 of the process 400, a test session may have been designed. The test session design may be done, for example, by an operator using a test administrator computing device coupled to one or more network cards, such as the network card 206. Designing the test session may include determining or defining the architecture of the network or network equipment, defining streams to be generated by each port unit during the test session, creating corresponding stream forming data, and forwarding respective stream forming data to at least one port unit on at least one network card. Designing the test session may include determining or defining what traffic statistics will be accumulated and reported during the test session. Designing the test session may include determining or defining capture criteria used to select packets to be captured during the test session and stored for further analysis.

At 415, a mode may be selected for the network card. Specifically, a first mode, in which the network cards is configured as four 10 GHz port units, or a second mode, in which the network card is configured as one 40 GHz port unit, may be selected.

When the first mode is selected at 415, the actions from 420 to 435 may be performed. At 420, the network card may be configured as four 10 GHz port units. Configuring the network card may include programming one or more programmable devices on the network card to include the circuits and functional modules necessary to perform the actions at 430 and 435. The one or more programmable devices on the network card may be programmed using configuration data read from a machine-readable storage medium.

At 425, before or after the network card is configured at 420, one or more ports of the network card may be connected to a network under test, such as the network 290. Connecting the one or more ports to the network under test may require manual connection of optical fiber cables or wired cables from the network card to the network under test. The one or more port units may also connect to the network under test wirelessly.

At 430, after the network card is configured and connected to the network under test, a network test may be conducted. Conducting a network test may include at least some port units generating and transmitting test traffic over the network under test. Conducting a network test may also include at least some port units receiving test traffic from the network under test and accumulating test data.

The test data may include traffic statistics. Traffic statistics may be accumulated for each of a plurality of packet groups. Traffic statistics may include quantitative data for each packet group such as the total number of packets and/or bytes receive and the total number of packets received out-of-sequence. Traffic statistics may include temporal data for each packet group such as the maximum and/or minimum latency.

The test data may also include captured packets. Captured packets may be selected in accordance with capture criteria set as part of the design of the test session.

The results of the network test may be reported at 435. Intermediate test results may be reported during the network test 430, and final test results may be reported after the network test 430 is concluded. Test results may be reported, for example, by sending test data such as traffic statistics, captured packets, and other information from the network card to the test administrator computing device. Test data for each port unit involved in the test may be reported independently. After all test results have been reported, the process 400 may end at 495.

When the second mode is selected at 415, the actions from 440 to 460 may be performed. At 440, the network card may be configured as one 40 GHz port unit. Configuring the network card may include programming one or more programmable devices on the network card to include the circuits and functional modules necessary to perform the actions at 450, 455, and 460. The one or more programmable devices on the network card may be programmed using configuration data read from a machine-readable storage medium.

At 445, before or after the network card is configured at 440, the 40 GHz port of the network card may be connected to a network under test, such as the network 290. Connecting the 40 GHz port to the network under test may require manual connection of optical fiber cables or wired cables from the network card to the network under test.

At 440, after the network card is configured and connected to the network under test, a network test may be conducted at 450. Conducting a network test at 450 may include the port unit generating and transmitting test traffic over the network under test. Conducting a network test may also include the port unit receiving test traffic from the network under test and accumulating test data. The test data may include traffic statistics for each of a plurality of packet groups. The test data may also include packets captured according to capture criteria set during the design of the test session. The test data may accumulated by a plurality of receive engines, such as the four receive engines 280A-D, within the network card.

The results of the network test may be reported, for example, to a test administrator computing device. Intermediate test results may be reported during the network test 450, and final test results may be reported after the network test 450 is concluded. Test results may be reported, for example, by sending test data such as traffic statistics, captured packets, and other information from the network card to the test administrator computing device. However, the test data to be reported may be distributed between a plurality of receive engines, such as the four receive engines 280A-D. At 470, the port unit may consolidate the test data from the plurality of receive engines before reporting the consolidated test results at 490. After all test results have been reported, the process 400 may end at 495.

Figure 5:
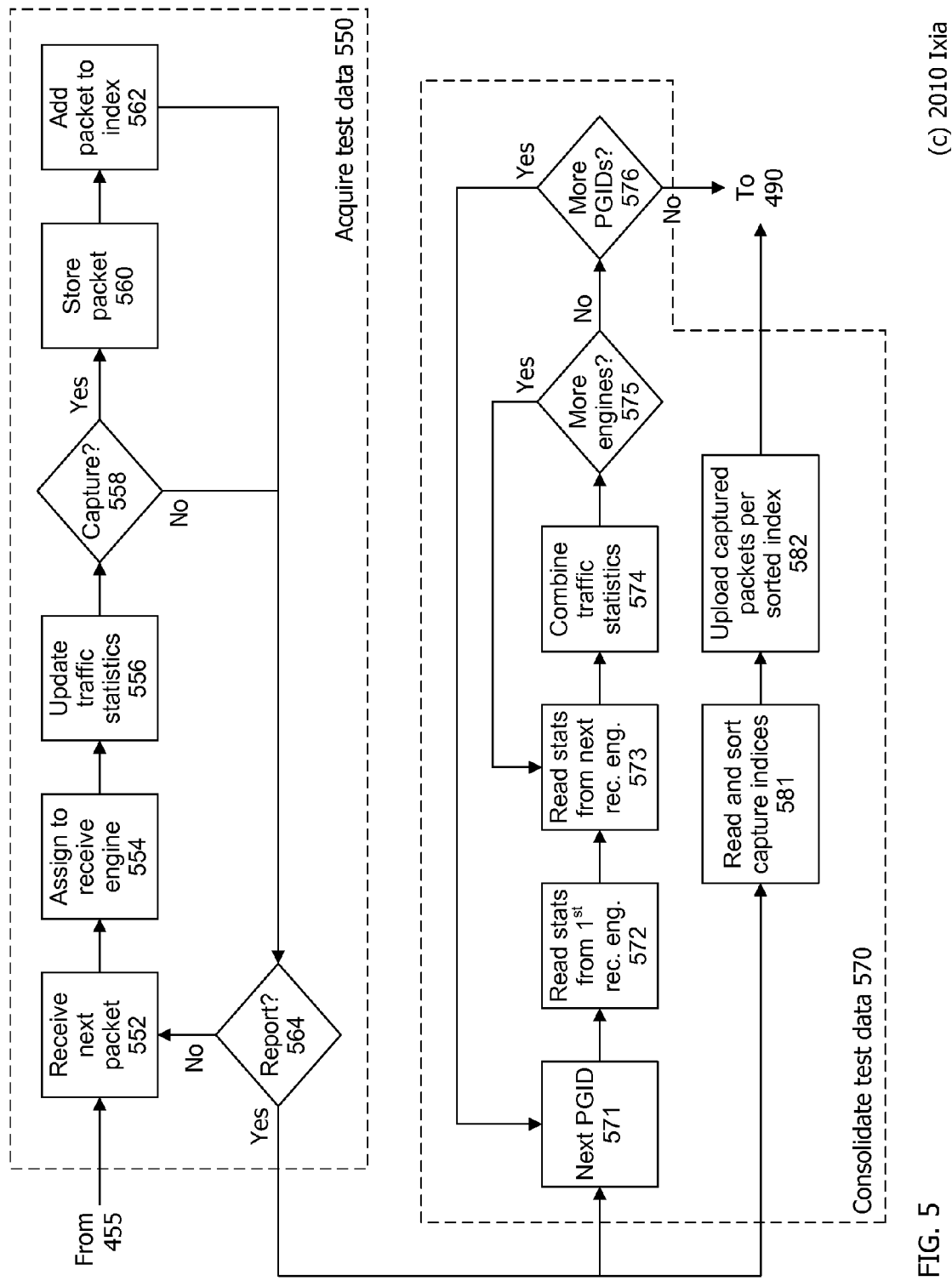
FIG. 5 is a flow chart of a process for conducting a network test and consolidating test results.

Referring now to FIG. 5, a process for acquiring and consolidating test data may include an acquire test data sub-process 550 and a consolidate test data sub-process 570. FIG. 5 is a flow chart of actions performed by a network card, such as the network card 206 configured in the second mode, when conducting a network test. The process of FIG. 5 may be performed in parallel by a plurality of network cards. The acquire test data sub-process 550 may be suitable for use as part of conducting a network test at 450. The consolidate test data sub-process 570 may be suitable for use at 470. For ease of description, the acquire test data sub-process 550 and the consolidate test data sub-process 570 are shown as sequential. However the acquire test data sub-process 550 and the consolidate test data sub-process 570 may be performed concurrently. For ease of description, the acquire test data sub-process 550 and the consolidate test data sub-process 570 are each shown as a series of sequential actions. However, either or both of the acquire test data sub-process 550 and the consolidate test data sub-process 570 may be done in a pipelined manner such that at least some of these actions may be performed concurrently.

The acquire test data sub-process 550 may be performed wholly or in part by hardware within a plurality of receive engines. The actions from 556-562 within the acquire test data sub-process 550 may be performed by the plurality of receive engines concurrently in parallel. The consolidate test data sub-process 570 may be performed by hardware within one or more of the plurality of receive engines and/or by software executed by a processor such as the port processor 212.

At 552, the network card receives a packet, for example at a 40 GHz network interface unit such as the network interface unit 260. At 554, the packet received at 552 is assigned and transferred to one of a plurality of receive engines such as the receive engines 270A-D. For example, the packet may be transferred at 554 by a packet distributor such as the packet distribution engine 268. A receive time stamp may be appended to, or associated with, the received packet at 552 or 554 before the packet is distributed to a receive engine.

At 556, traffic statistics associated with the received packet may be updated. For example, a receive engine may extract a packet group identifier from the received packet. Traffic statistics for the identified packet group may be retrieved from a statistics memory within or coupled to the receive engine. The receive engine may update the traffic statistics to reflect receipt of the received packet. For example, the retrieved traffic statistics may include individual statistics indicating a number of packets received and a total number of bytes for the identified packet group. The receive engine may update the traffic statistics by incrementing the number of packets received and by adding a length of the received packet to the total number of bytes received. The updated traffic statistics may then be stored in the statistics memory.

Each of a plurality of receive engines may store traffic statistics in a respective statistics memory such that each statistics memory stores a portion of the total traffic statistics. Traffic statistics for any packet group may be stored in one, more, or all of a plurality of statistics memories respectively associated with a plurality of receive engines.

At 558 a determination may be made whether or not the received packet should be captured or stored for further analysis. The determination may be made by comparing characteristics of the received packet with predetermined capture criteria. For example, capture criteria may be set during design of a test session. The capture criteria may specify whether or not a packet should be captured in terms of a range of packet group identifiers, a range of IP addresses, one or more ports, one or more types of packets or protocols, or combinations of these and other characteristics of the received packet. The predetermined capture criteria may be common to all of a plurality of receive engines.

When a determination is made at 558 that the received packet should be captured, the received packet may be stored in a capture memory within or coupled to the received engine at 560. Additionally, to facilitate retrieval of the packet stored at 560, information identifying the stored packet may be added to a captured packet index at 562. The captured packet index may include information identifying each captured packet in association with an address or pointer to the location in the capture memory where each packet is stored. For example, the captured packet index may include, for each captured packet, the receive timestamp of the packet, an address in the capture memory where a first byte, word, or other portion of the packet is stored, and a length of the stored packet.

Each of a plurality of receive engines may stored captured packets in a respective one of a plurality of capture memories. Each of the plurality of receive engines may create a respective captured packet index associated with the captured packets stored in the respective capture memory.

After a received packet is captured and indexed at 560/562, or when a determination is made at 558 that the received packet will not be captured, a determination may be made at 564 whether or not test data should be reported. Test data may commonly be reported at the conclusion of a test session. Test data may also be reported during a test session, either at predetermined intervals or in response to an operator request. When a determination is made at 564 that test data will not be reported, the acquire test data sub-process 550 may return to 552 to receive a next packet.

When a determination is made at 564 that test data will be reported, the consolidate test data sub-process 570 may be performed in preparation for reporting test data. The acquire test data sub-process 550 may continue while the consolidate test data sub-process 570 is performed.

The actions from 571 to 576 consolidate traffic statistics acquired by a plurality of receive engines. The actions from 581 to 582 consolidate packet captured by a plurality of receive engines. In some circumstances, only traffic statistics may be reported and the actions from 581 to 582 need not be performed. In other circumstances, only captured packets may be reported and the actions from 571 to 576 need not be performed.

At the end of a test session, traffic statistics may be consolidated for all packet groups received during the session. When test data is reported during a test session, traffic statistics may be consolidated for all packet groups, a single packet group, or a plurality of packet groups defined, for example, by a range of packet group identifiers.

At 571, a first packet group identifier may be selected from one or more packet group identifiers to be reported. At 572, traffic statistics for the packet group associated with the selected packet group identifier may be retrieved from the statistics memory within or coupled to a first receive engine. At 573, traffic statistics for the associated packet group may be retrieved from the statistics memory within or coupled to another receive engine, and the two sets of traffic statistic may be combined at 574. Two sets of traffic statistics may be combined by performing an appropriate operation on each pair of individual statistics. For example, each set of traffic statistics may include a number of packets received by the respective receive engine, which may be combined by simple addition. For further example, each set of traffic statistics may include a maximum latency time, which can be combined by selecting the larger of the two maximum latency time values. Other individual traffic statistics may be combined by appropriate mathematical or logical operations.

At 575, a determination may be made if traffic statistics from another receive engine should be combined with the results from 574. If traffic statistics from another receive engine need to be combined, the actions from 573 to 575 may be repeated cyclically until all traffic statistics associated with the packet group identifier selected at 571 have been combined. The consolidation of traffic statistics associated with a packet group identifier is not necessarily an iterative process as shown in FIG. 5. Alternatively, for example, the traffic statistics for all receive engines may be retrieved first and the retrieved traffic statistics may be combined in a single operation. Traffic statistics for a plurality of receive engines may be combined using some other process.

At 576, a determination may be made if traffic statistics for another packet group identifier should be combined. If traffic statistics for another packet group identifier need to be combined, the actions from 571 to 576 may be repeated cyclically until all traffic statistics have been consolidated. When all traffic statistics for the required packet groups have been consolidated, the consolidated traffic statistics may be reported, for example at 490 in FIG. 4.

Captured packets may be reported by uploading the captured packets, for example to a test administrator computing device, for further analysis. The captured packets may simply be read from capture memories associated with a plurality of receive engines and uploaded to the test administrator. To facilitate analysis by the test administrator, the captured packets may be uploaded in timestamp order as illustrated in FIG. 5. For example, at 581, the captures indices generated by the plurality of receive engines may be read and sorted by timestamp to create a merged index of captured packets in timestamp order. The merged index from 581 may then be used to upload captured packets from a plurality of capture memories in timestamp order.

Since the individual capture indices created by the plurality of receive engines are inherently in timestamp order, captured packets may be uploaded without generating a merged index. A plurality of read pointers may be respectively associated a plurality capture indices generated by a corresponding plurality of receive engines. The value of a read pointer may be set to the timestamp of the earliest entry in the respective capture index that has not yet been uploaded to the test administrator. The lowest value of the plurality of read pointers points to a capture index entry that, in turn, identifies the next packet to be uploaded to the test administrator. Each read pointer may be updated each time a packet is uploaded form the respective capture memory. In this manner, captured packets may be sorted in timestamp order as they are uploaded to the test administrator.

Application Ser. No. 12/420,771, entitled Traffic Receiver Using Parallel Capture Engines, describes additional methods and apparatus for capturing packets using parallel capture engines, including techniques for removing inappropriately captured packets and techniques for ensuring that the reported packets only include consecutively capture packets. These techniques may optionally be incorporated into the consolidate test data process 570.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A network card configurable in a first mode or a second mode, comprising:
    a scheduler to schedule packets to be generated, the scheduler providing, for each packet to be generated, a stream identifier and variable data;
    four 10 GHz transmit engines to generate packets at a data rate of 10 GHz, each transmit engine further comprising:
        a template memory storing a plurality of packet templates associated with a corresponding plurality of streams,
        a background engine to select a packet template from the template memory for each packet to be generated in accordance with the respective stream identifier provided by the scheduler, and
        an overlay fill engine to insert the respective variable data provided by the scheduler into the selected packet template;
    four 10 GHz receive engines to receive and process packets at a data rate of 10 GHz; and
    when configured in the first mode, further comprising:
        four 10 GHz network interface units coupled to respective ones of the four 10 GHz transmit engines and the four 10 GHz receive engines, each 10 GHz network interface unit adapted to transmit packets generated by the respective 10 GHz transmit engine to a network under test and to direct packets received from the network under test to the respective 10 GHz receive engine,
        wherein the scheduler is configured in the first mode to schedule four independent 10 GHz packet streams to be generated by respective ones of the four 10 GHz transmit engines;
    when configured in the second mode, further comprising:
        a coherent multiplexer to combine packets generated by the four 10 GHz transmit engines into test traffic at a 40 GHz data rate,
        a packet distribution engine to accept packets at a 40 GHz data rate and distribute the accepted packets between the four 10 GHz receive engines, and
        a 40 GHz network interface unit coupled to the coherent multiplexer and the packet distribution engine, the 40 GHz network interface unit adapted to transmit the test traffic formed by the coherent multiplexer to a network under test and to direct traffic received from the network to the packet distribution engine,
        wherein the scheduler is configured in the second mode to schedule one 40 GHz packet stream to be generated by the four 10 GHz transmit engines collectively.

2. The network card of claim 1, wherein
the network card comprises one or more programmable hardware devices, and
the network card is configured in one of the first mode and the second mode by programming the one or more programmable hardware devices.

3. An apparatus for testing a network, comprising:
a network card configurable in a first mode to provide N bidirectional test ports operable at a first data rate, and configurable in a second mode to provide a single bidirectional test port operable at a second data rate higher than the first data rate, wherein N is an integer greater than one,
the network card further comprising:
a scheduler selectively configurable to schedule N test traffic streams at the first data rate in the first mode or one test traffic stream at the second data rate in the second mode, the scheduler providing, for each packet in the test traffic streams, a stream identifier and variable data;
N transmit engines to generate packets at the first data rate, each transmit engine further comprising:
a template memory storing a plurality of packet templates associated with a corresponding plurality of streams,
a background engine to select a packet template from the template memory for each packet to be generated in accordance with the respective stream identifier provided by the scheduler, and
an overlay fill engine to insert the respective variable data provided by the scheduler into the selected packet template;
N receive engines to receive and process packets at the first data rate;
wherein the network card is configured in one of the first mode and the second mode by programming one or more programmable hardware devices included in the network card.

4. The apparatus of claim 3, wherein, when configured in the first mode, the network card further comprises:
N first-data-rate network interface units coupled to respective ones of the N transmit engines and the N receive engines, each first-data-rate network interface unit adapted to:
transmit packets generated by the respective transmit engine to a network under test at the first data rate, and
direct packets received from the network under test at the first data rate to the respective receive engine.

5. The apparatus of claim 3, wherein, when configured in the second mode, the network card comprises:
a coherent multiplexer to combine packets generated by the N transmit engines into test traffic at the second data rate;
a packet distribution engine to accept packets at the second data rate and distribute the accepted packets between the N receive engines; and
a second-data-rate network interface unit coupled to the coherent multiplexer and the packet distribution engine, the second-data-rate network interface unit adapted to
transmit the test traffic formed by the coherent multiplexer to a network under test at the second data rate, and
direct traffic received from the network at the second data rate to the packet distribution engine.

6. The apparatus of claim 3, where in the second data rate is essentially N times the first data rate.

7. A method to test a network, comprising:
configuring a network card in one of a first mode to provide four bidirectional 10 GHz test ports and a second mode to provide a single bidirectional 40 GHz test port;
a scheduler scheduling four 10 GHz packet streams, the scheduler providing, for each packet in the packet streams, a stream identifier and variable data;
four 10 GHz transmit engines generating packets for the four 10 GHz packet streams, generating each packet further comprising:
selecting a packet template from a template memory in accordance with the respective stream identifier provided by the scheduler, the template memory storing a plurality of templates associated with a corresponding plurality of streams, and
inserting the respective variable data provided by the scheduler into the selected packet template; and
when the network card is configured in the first mode:
transmitting the four 10 GHz packet streams to the network via the four 10 GHz test ports respectively,
receiving test traffic form the network via the four 10 GHz test ports, and
processing the test traffic with four 10 GHz receive engines, each receive engine coupled to a corresponding one of the four 10 GHz test ports;
when the network card is configured in the second mode:
coherently multiplexing the packets generated by the four 10 GHz transmit engines to form the 40 GHz packet stream,
transmitting the 40 GHz packet stream to the network and receiving 40 GHz test traffic from the network via the 40 GHz test port, and
distributing the received 40 GHz test traffic between the four 10 GHz receive engines.

8. The method for testing a network of claim 7, wherein configuring the network card further comprises programming at least one programmable hardware device.

9. The method for testing a network of claim 7, further comprising, when the network card is configured in the first mode:
reporting test results independently for each of the four 10 GHz receive engines.

10. The method for testing a network of claim 7, further comprising, when the network card is configured in the second mode:
consolidating tests results from the four 10 GHz receive engines; and
reporting the consolidated results.

11. A machine-readable non-transitory storage medium storing configuration data which, when used to program one or more programmable devices, causes a network card to be configured in one of two selectable modes, the network card comprising:
a scheduler to schedule packets to be generated, the scheduler providing, for each packet to be generated, a stream identifier and variable data;
four 10 GHz transmit engines to generate packets at a data rate of 10 GHz, each transmit engine further comprising:
a template memory storing a plurality of packet templates associated with a corresponding plurality of streams,
a background engine to select a packet template from the template memory for each packet to be generated in accordance with the respective stream identifier provided by the scheduler, and
an overlay fill engine to insert the respective variable data provided by the scheduler into the selected packet template;

four 10 GHz receive engines to receive and process packets at a data rate of 10 GHz; and when configured in the first mode, further comprising:
four 10 GHz network interface units coupled to respective ones of the four 10 GHz transmit engines and the four 10 GHz receive engines, each 10 GHz network interface unit adapted to transmit packets generated by the respective 10 GHz transmit engine to a network under test and to direct packets received from the network under test to the respective 10 GHz receive engine,
wherein the scheduler is configured in the first mode to schedule four independent 10 GHz packet streams to be generated by respective ones of the four 10 GHz transmit engines;

when configured in the second mode, further comprising:
a coherent multiplexer to combine packets generated by the four 10 GHz transmit engines into test traffic at a 40 GHz data rate,
a packet distribution engine to accept packets at a 40 GHz data rate and distribute the accepted packets between the four 10 GHz receive engines, and
a 40 GHz network interface unit coupled to the coherent multiplexer and the packet distribution engine, the 40 GHz network interface unit adapted to transmit the test traffic formed by the coherent multiplexer to a network under test and to direct traffic received from the network to the packet distribution engine, wherein the scheduler is configured in the second mode to schedule one 40 GHz packet stream to be generated by the four 10 GHz transmit engines collectively.

\* \* \* \* \*